(12) United States Patent
Zhang et al.

(10) Patent No.: US 10,852,132 B1
(45) Date of Patent: Dec. 1, 2020

(54) FIBER BRAGG GRATING INCLINATION SENSOR

(71) Applicants: Chunwei Zhang, Shandong (CN); Li Sun, Liaoning (CN)

(72) Inventors: Chunwei Zhang, Shandong (CN); Li Sun, Liaoning (CN); Chuang Li, Liaoning (CN); Zhongxin Su, Liaoning (CN); Cuipeng Gu, Liaoning (CN); Tianqi Liang, Liaoning (CN)

(73) Assignees: Chunwei Zhang, Qingdao (CN); Li Sun, Shenyang (CN)

( * ) Notice: Subject to any disclaimer, the term of this patent is extended or adjusted under 35 U.S.C. 154(b) by 2 days.

(21) Appl. No.: 16/416,011

(22) Filed: May 17, 2019

(51) Int. Cl.
| | |
|---|---|
| *G01C 9/06* | (2006.01) |
| *G01C 9/00* | (2006.01) |
| *G01M 11/08* | (2006.01) |
| *G01B 11/26* | (2006.01) |
| *G01D 5/353* | (2006.01) |

(52) U.S. Cl.
CPC .............. *G01C 9/06* (2013.01); *G01B 11/26* (2013.01); *G01C 9/00* (2013.01); *G01D 5/35316* (2013.01); *G01M 11/085* (2013.01); *G01C 2009/066* (2013.01)

(58) Field of Classification Search
None
See application file for complete search history.

(56) References Cited

U.S. PATENT DOCUMENTS

| 7,319,514 B2* | 1/2008 | Ritchie | G01C 9/06 |
| | | | 33/534 |
| 10,451,449 B2* | 10/2019 | Knoppers | G01P 15/093 |
| 10,551,255 B2* | 2/2020 | Matthijssen | G01H 9/004 |
| 2002/0092976 A1* | 7/2002 | Sugai | G01L 1/246 |
| | | | 250/227.14 |
| 2003/0095249 A1* | 5/2003 | Ferdinand | G01B 11/18 |
| | | | 356/139.1 |
| 2005/0169568 A1* | 8/2005 | Shang | G01C 9/06 |
| | | | 385/13 |
| 2009/0185773 A1* | 7/2009 | Lee | G01M 11/085 |
| | | | 385/13 |

(Continued)

FOREIGN PATENT DOCUMENTS

| GB | 2424700 A | * 10/2006 | G01V 1/184 |
| JP | 2002250610 A | * 9/2002 | G01L 1/246 |
| JP | 2009058239 A | * 3/2009 | |

*Primary Examiner* — Michelle R Connelly
(74) *Attorney, Agent, or Firm* — Wayne & Ken, LLC; Tony Hom

(57) ABSTRACT

A fiber Bragg grating inclination sensor, including a semicircular substrate and a packaged fiber Bragg grating. The semicircular substrate is fixed on a first structural member. One endpoint of the semicircular substrate is bonded with one end of the packaged fiber Bragg grating, and the other end of the packaged fiber Bragg grating is connected to a second structural member. The first structural member is fixed to the second structural member perpendicular to the first structural member. The packaged fiber Bragg grating is arranged on a tangent to the semicircular substrate. The fiber Bragg grating sensor of the present invention has the advantages of anti-electromagnetic interference and high sensitiveness. The present invention has a simple structure, high measurement accuracy, good stability, thereby having broad application prospects.

5 Claims, 3 Drawing Sheets

(56) References Cited

U.S. PATENT DOCUMENTS

| | | | | |
|---|---|---|---|---|
| 2011/0194806 A1* | 8/2011 | Hartog | ................ | G01C 9/18 385/13 |
| 2019/0308693 A9* | 10/2019 | Lee | ................ | G01M 3/00 |

* cited by examiner

FIBER BRAGG GRATING INCLINATION SENSOR

TECHNICAL FIELD

The present application relates to fiber Bragg grating sensing and monitoring, and more particular to a fiber Bragg grating inclination sensor.

BACKGROUND OF THE INVENTION

Differential settlement of foundations will severely and adversely affect house structures, which may cause global or local inclination of the structure, and structural cracking may occur as the result of a large local inclination. Therefore, monitoring the inclination of structural members is of great importance. The conventional inclination sensors are mainly electrical sensors, and the signal is susceptible to interference, thereby causing low accuracy.

SUMMARY OF THE INVENTION

The present application relates to a fiber Bragg grating inclination sensor.

The technical solutions of the present invention are as follows.

A fiber Bragg grating inclination sensor comprises a first structural member, a second structural member, a semicircular substrate, and a packaged fiber Bragg grating.

The semicircular substrate is fixed on the first structural member, and one endpoint of the semicircular substrate is bonded with one end of the packaged fiber Bragg grating.

The other end of the packaged fiber Bragg grating is connected to the second structural member. The first structural member is fixed to the second structural member perpendicular to the first structural member.

The packaged fiber Bragg grating is arranged on a tangent to the semicircular substrate.

The present invention has the following benefits.

1. The fiber Bragg grating sensor of the present invention has the advantages of anti-electromagnetic interference, high sensitiveness and high accuracy.

2. The present invention has a simple structure, high measurement accuracy, good stability, thereby having broad application prospects.

DETAILED DESCRIPTION OF EMBODIMENTS

Figure 1:
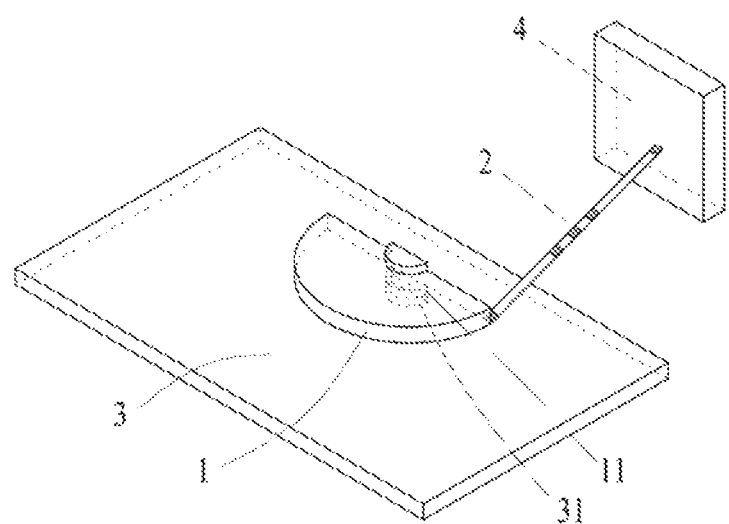
FIG. 1 is a schematic diagram of a fiber Bragg grating inclination sensor of the present invention.

The present invention will be further described in detail below with reference to the accompanying drawings.

A fiber Bragg grating inclination sensor, comprising a first structural member 3, a second structural member 4, a semicircular substrate 1, and a packaged fiber Bragg grating 2.

The semicircular substrate 1 is fixed on the first structural member 3, and one endpoint of the semicircular substrate 1 is bonded with one end of the packaged fiber Bragg grating 2.

The other end of the packaged fiber Bragg grating 2 is connected to the second structural member 4. The first structural member 3 is fixed to the second structural member 4 perpendicular to the first structural member 3.

The packaged fiber Bragg grating 2 is arranged on a tangent to the semicircular substrate 1.

A lower portion of the semicircular substrate 1 is provided with a fixing flange 11; the first structural member 3 is provided with a recess 31 to fix the fixing flange.

The semicircular substrate is made of Q235 steel.

An adhesive for the packaged fiber Bragg grating is 353ND.

A bottom surface of the semicircular substrate is bonded onto a surface of the first structural member.

Working principle of the present invention is as follows.

Figure 2:
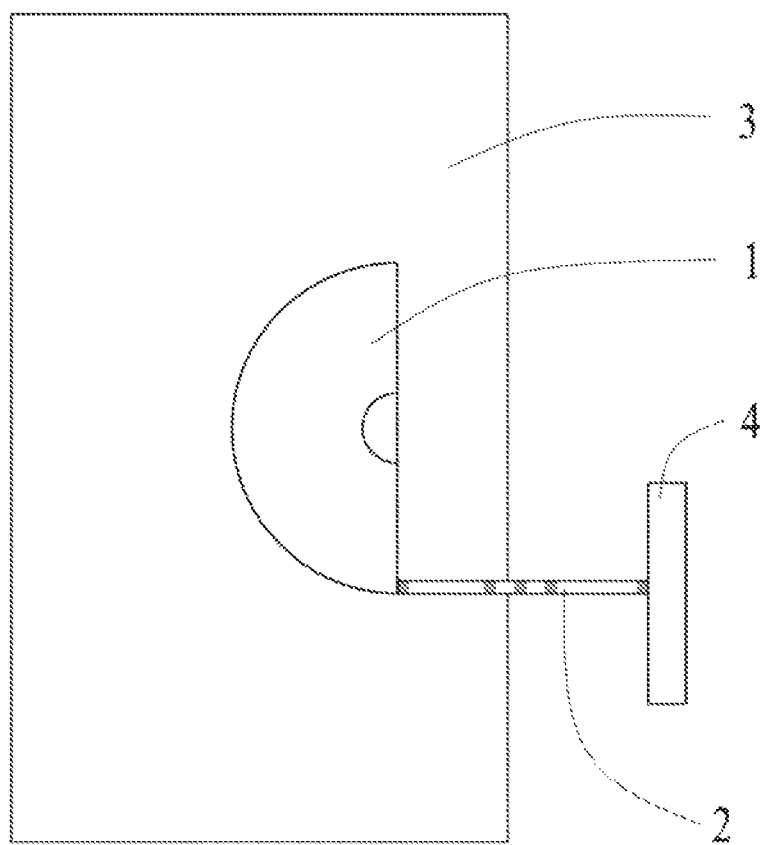
FIG. 2 is a top view of the fiber Bragg grating inclination sensor of the present invention.
Figure 3:
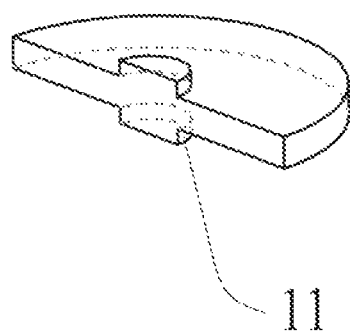
FIG. 3 is a perspective view of a semicircular substrate of the present invention.

When the semicircular substrate 1 is rotated, θ is the inclination angle, and R is the radius of the semicircular structure. Referring to FIG. 2, $$L_{AM} = L_1 \qquad (1)$$

where $L_{AM}$ and $L_1$ each are the initial length of a sensor of the packaged fiber Bragg grating 2;

$$L_{AM'} = L_1 + \left(\frac{\Delta\lambda_B}{K_\varepsilon}\right) \times L_1 \qquad (2)$$

where $L_{AM'}$ is the changed length of the packaged fiber Bragg grating 2;

$$\theta = 2\alpha \qquad (3)$$

θ is the central angle, and α is the circumferential angle;

$$L_{MM'} = 2R \times \sin\left(\frac{\theta}{2}\right) \qquad (4)$$

According to the law of cosines, $$\cos\alpha = \frac{L_{AM'}^2 + L_{AM}^2 - L_{MM'}^2}{2 \times L_{AM'} \times L_{AM}} \qquad (5)$$

plug (3) and (4) into (5), $$\cos\left(\frac{\theta}{2}\right) = \frac{L_{AM} \times L_{AM'} - \sqrt[2]{(4R^2 - L_{AM}^2) \times (4R^2 - L_{AM'}^2)}}{4R^2} \qquad (6)$$

$$\theta = 2\arccos\frac{L_{AM} \times L_{AM'} \sqrt[2]{4R^2 - L_{AM}^2) \times (4R^2 - L_{AM'}^2)}}{4R^2} \qquad (7)$$

where R is the radius;

and plug (1) and (2) into (7), $$\theta = 2\arccos\frac{L_1^2 \times \left(1 + \frac{\Delta\lambda_B}{K_\varepsilon}\right) - \sqrt{\begin{array}{c}(2R+L_1)\times(2R-L_1)\times \\ \left[2R+L_1\times\left(1+\frac{\Delta\lambda_B}{K_\varepsilon}\right)\right]\times \\ \left[2R-L_1\times\left(1+\frac{\Delta\lambda_B}{K_\varepsilon}\right)\right]\end{array}}}{(4R^2)}. \quad (8)$$

This equation gives a theoretical relationship between the inclination angle θ and the wavelength change $\Delta\lambda_B$. By demodulating the wavelength change of the sensor of the packaged fiber Bragg grating 2, a change value of the inclination angle of the semicircular substrate 1 is obtained, realizing a real-time online monitoring of the structural inclination.

We claim:

1. A fiber Bragg grating inclination sensor, comprising: a first structural member,
   a second structure member,
   a semicircular substrate, and
   a packaged fiber Bragg grating;
   wherein the semicircular substrate is fixed on the first structural member, and one endpoint of the semicircular substrate is bonded with one end of the packaged fiber Bragg grating;
   the other end of the packaged fiber Bragg grating is connected to the second structural member; the first structural member is fixed to the second structural member perpendicular to the first structural member; and
   the packaged fiber Bragg grating is arranged on a tangent to the semicircular substrate.

2. The fiber Bragg grating inclination sensor of claim 1, wherein a lower portion of the semicircular substrate is provided with a fixing flange; and the first structural member is provided with a recess to fix the fixing flange.

3. The fiber Bragg grating inclination sensor of claim 1, wherein the semicircular substrate is made of Q235 steel.

4. The fiber Bragg grating inclination sensor of claim 1, wherein an adhesive for the packaged fiber Bragg grating is 353ND.

5. The fiber Bragg grating inclination sensor of claim 1, wherein a bottom surface of the semicircular substrate is bonded onto a surface of the first structural member.

* * * * *